US00RE40439E

(19) United States
(12) Reissued Patent
Brehob et al.

(10) Patent Number: US RE40,439 E
(45) Date of Reissued Patent: Jul. 22, 2008

(54) METHOD TO CONTROL ELECTROMECHANICAL VALVES

(75) Inventors: Diana D. Brehob, Dearborn, MI (US); Eric Warren Curtis, Milan, MI (US); William Francis Stockhausen, Northville, MI (US)

(73) Assignee: Ford Global Technologies, LLC, Dearborn, MI (US)

(21) Appl. No.: 11/583,382

(22) Filed: Oct. 18, 2006

Related U.S. Patent Documents

Reissue of:
(64) Patent No.: 6,805,079
Issued: Oct. 19, 2004
Appl. No.: 09/682,959
Filed: Nov. 2, 2001

(51) Int. Cl.
*F01L 9/04* (2006.01)

(52) U.S. Cl. ..... 123/90.11; 123/90.15; 123/90.24; 251/129.07

(58) Field of Classification Search ..... 123/90.11
See application file for complete search history.

(56) References Cited

U.S. PATENT DOCUMENTS 4,829,947 A * 5/1989 Lequesne ..... 123/90.11
5,074,259 A * 12/1991 Pusic ..... 123/90.11
5,669,341 A * 9/1997 Ushirono et al. ..... 123/90.11
5,752,478 A * 5/1998 Sono et al. ..... 123/90.11
6,170,445 B1 * 1/2001 Hattori et al. ..... 123/90.11
6,202,607 B1 * 3/2001 Kreuter ..... 123/90.11
6,340,008 B1 * 1/2002 Boie et al. ..... 123/90.11
6,343,577 B2 * 2/2002 Toriumi ..... 123/90.11
7,165,529 B2 * 1/2007 Brehob et al. ..... 123/305

* cited by examiner

*Primary Examiner*—Thomas Denion
*Assistant Examiner*—Kyle M. Riddle
(74) *Attorney, Agent, or Firm*—Diana Brehob; Alleman Halt McCoy Russell & Tuttle LLP

(57) ABSTRACT

A system for controlling electromechanical of an internal combustion has a valve-closing electromagnet for attracting the armature coupled to the valve to close the valve, a valve-opening electromagnet for attracting the armature to open the valve, a valve-opening spring for biasing the valve open, and a valve-closing spring for biasing the valve closed. The method includes de-energizing the valve-closing electromagnet for a predetermined time, enabling the valve to oscillate by the valve springs, and then energizing the valve-closing electromagnet to close the valve. Consequently, only the valve-closing electromagnet is energized to open and close the valve. The valve biasing springs force the valve to a location at which the valve-closing electromagnet can close the valve. This provides an electrical energy over prior methods in which both the valve-opening and valve-closing electromagnets are energized to actuate the valve.

48 Claims, 5 Drawing Sheets

METHOD TO CONTROL ELECTROMECHANICAL VALVES

Matter enclosed in heavy brackets [ ] appears in the original patent but forms no part of this reissue specification; matter printed in italics indicates the additions made by reissue.

BACKGROUND OF INVENTION

1. Field of the Invention

The present invention relates generally to a method for controlling electromechanical valves in an internal combustion engine.

2. Background of the Invention

An electromechanically operated poppet valve in the cylinder head of an internal combustion, as disclosed in U.S. Pat. No. 4,455,543, is actuated by energizing and de-energizing electromagnets acting upon an armature coupled to the poppet valve. Because the actuation of the electromagnets is controlled by an electronic control unit, valve opening and closing events occur independently of engine rotation. In conventional engines with camshaft actuated valves, which have timings based on engine rotation, air delivery to the cylinders is controlled by a throttle valve placed in the inlet duct of the engine. In contrast, electromechanical valves are capable of controlling air delivery based on valve timing, thereby providing a thermal efficiency improvement over throttled operation of a conventional engine.

However, a drawback to electromechanical valves is the amount of electrical energy consumed in actuating them. The inventors of the present invention have recognized a method to operate electromechanical valves in a manner which consumes less electrical energy than prior methods.

SUMMARY OF INVENTION

Disadvantages of prior methods are overcome by a method for actuating an intake valve disposed in a cylinder head of an internal combustion engine by an electromagnetic valve apparatus. The apparatus has a valve closing electromagnet capable of exhibiting an electromagnetic force for attracting the armature to close the valve, a valve opening electromagnet capable of exhibiting an electromagnetic force for attracting the armature to open the valve, a valve opening spring for biasing the armature in a direction to open the valve, and a valve closing spring for biasing the armature in a direction to close the valve. The method includes the steps of actuating the valve according to a first mode when a first set of engine operating conditions are detected and actuating the valve according to a second mode when a second set of engine operating conditions are detected. The first mode further includes the steps of de-energizing the valve closing electromagnet, maintaining the valve closing electromagnet in the de-energized state for a first predetermined time enabling the valve to oscillate by force of the valve opening spring and the valve closing spring, and energizing the valve closing electromagnet after the first predetermined time to close the valve. The second mode further includes the steps of de-energizing the valve closing electromagnet to allow the valve to open, energizing the valve opening electromagnet in response to said de-energizing step to attract the armature to the valve opening electromagnet thereby causing the valve to open, de-energizing the opening electromagnet after a second predetermined time has elapsed since the valve opening electromagnet has been energized, and energizing the valve closing electromagnet in response to the de-energizing step of the valve opening electromagnet to attract the armature to the valve closing electromagnet thereby causing the valve to close.

An electromagnetic valve apparatus for actuating a valve disposed in a cylinder head of a multi-cylinder internal combustion engine is disclosed which has an armature operatively connected to the valve, a valve closing electromagnet capable of exhibiting an electromagnetic force for attracting said armature to close the valve, a valve opening spring coupled to the armature for biasing the armature in a direction to open the valve, a valve closing spring coupled to the valve for biasing the valve to a closed position, and an electronic control unit operably connected to the valve closing electromagnet. The electronic control unit de-energizes the valve closing electromagnet allowing the valve to oscillate by force of the valve opening spring and the valve closing spring and maintains the valve closing electromagnet in the de-energized state at least until the valve travels to a nearly open position and returns to a nearly closed position. The predetermined time is based on dynamic characteristics of the valve and the electromagnetic valve apparatus. The valve is an intake valve of the engine. Intake air flows past an oscillating intake valve.

A primary advantage of the present invention is that the amount of energy utilized in actuating a valve is approximately half of prior art actuation methods.

According to an aspect of the present invention, the valve may be opened for a period of time over which the valve oscillates between a nearly open position and a nearly closed position. Compared with prior methods in which the valve is maintained in a fully open position for the entire duration of opening, the present invention provides more intake turbulence to the incoming air stream by virtue of the air being inducted past an intake valve which is at a half open position, on average.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
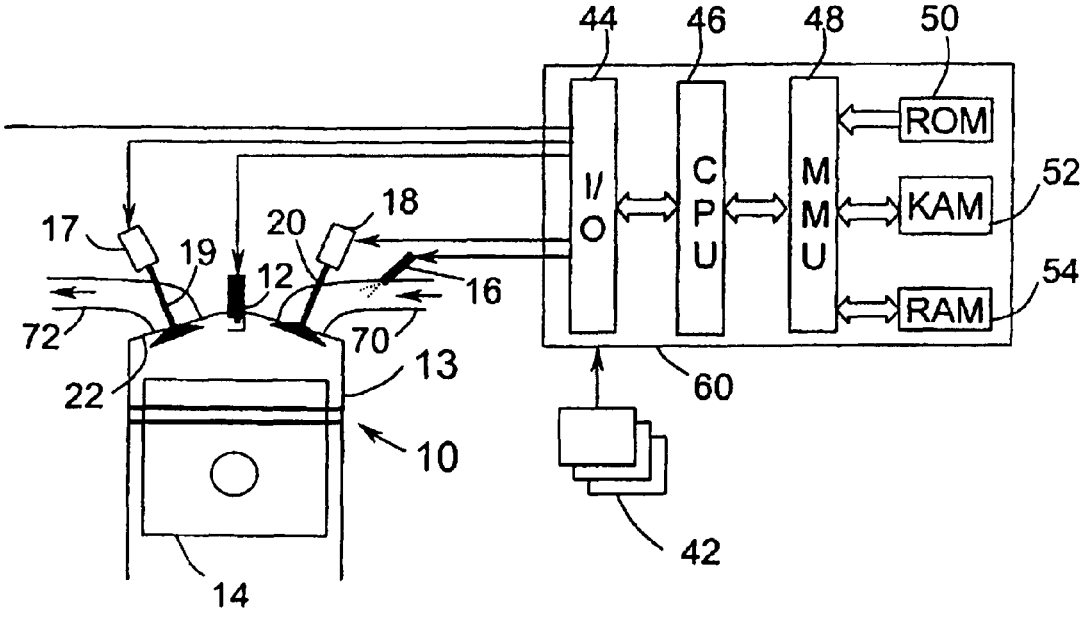
FIG. 1 is a schematic of an engine equipped with electromechanically-actuated poppet valves.

In FIG. 1, a single cylinder 13 of an internal combustion engine 10 with an electromechanical intake valve 20 and exhaust valve 19 is shown. Engine 10 contains a piston 14 which reciprocates within cylinder 13. Intake valve 20, disposed in cylinder head 22, is opened to allow gases to communicate between the combustion chamber (the volume enclosed by cylinder 13, piston 14, and cylinder head 22) and intake port 70. When exhaust valve 19 is opened, gases are released from the combustion chamber into exhaust port 72. In the embodiment shown in FIG. 1, fuel is injected into intake port 70 by injector 16, a configuration commonly called port fuel injection. However, the present invention applies to any fuel delivery method, including direct injection, central injection, and carburetion. Intake valve 20 and exhaust valve 19 are actuated electromechanically by valve actuators 18 and 17, respectively. In a preferred embodiment, engine 10 is a spark-ignited engine, spark plug 12 initiates combustion in the combustion chamber. The present invention also applies to engines with other types of ignitors and to compression ignition engines in which the fuel and air spontaneously ignite due to a compression generated temperature rise in the combination chamber. Both diesel and homogeneous charge compression ignition are examples of the latter type of engine.

Continuing to refer to FIG. 1, electronic control unit (ECU) 60 is provided to control engine 10. ECU 60 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve position, spark plug 12 timing, actuation of valve actuators 18 and 17 to control opening and closing of intake valve 20 and exhaust valve 19, respectively, and others. Sensors 42 communicating input through I/O interface 44 may be indicating piston position, engine rotational speed, vehicle speed, coolant temperature, intake manifold pressure, pedal position, throttle valve position, air temperature, exhaust temperature, exhaust stoichiometry, exhaust component concentration, and air flow. Some ECU 60 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 60 may contain multiple ROM 50, RAM 54, and KAM 52 coupled to MMU 48 or CPU 46 depending upon the particular application.

Figure 2:
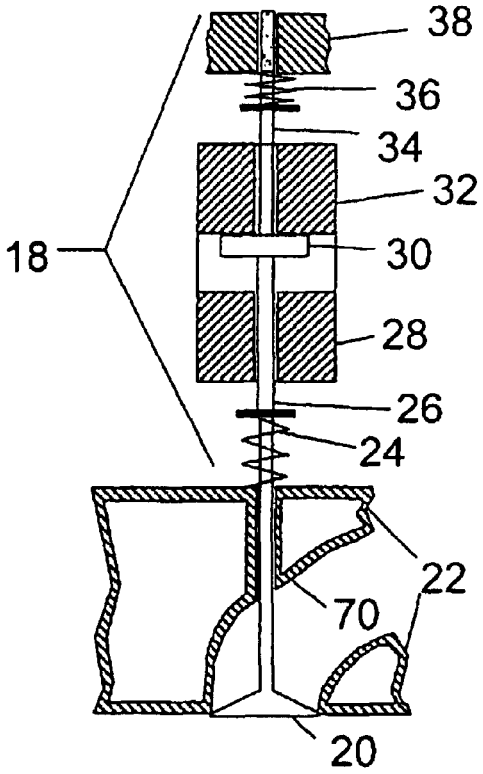
FIG. 2 is a detail of an example of an electromechanically-actuate poppet valve in a closed position.

In FIG. 2, an example of an electromechanical valve actuator 18 is shown in which intake valve 20 is in a closed position. Intake valve 20 closes off port 70 in cylinder head 22. Valve actuator 18 is shown in detail in FIG. 2. A valve closing spring 24 biases valve 20 to the closed position. Armature 30 is disposed between two electromagnets: a valve closing electromagnet 32 and valve opening electromagnet 28. Armature 30 is connected to shafts 26 and 34. As shown in FIG. 2, armature 30 is next to valve closing electromagnet 32. For this position to prevail, valve closing electromagnet 32 is energized. Otherwise, armature 30 would act under the influence of valve closing spring 24 and valve opening spring 36. In the embodiment shown in FIG. 2, valve opening spring is attached to shaft 34 at the lower end of valve opening spring 36. Other alternative configurations may also provide the same functionality. If both electromagnets 28 and 32 are de-energized, armature 30 is influenced by springs 24 and 36 and attains a neutral position in between electromagnets 28 and 34. Valve actuator 17 and exhaust valve 19 can also be represented by FIG. 2, by way of example.

Continuing to refer to FIG. 2, valve actuator 18 preferably includes a valve position sensing device, such as a linear variable differential transformer (LVDT) 38. The tip of shaft 34 forms the core of the position sensor. The inductance of the LVDT varies when the position of the shaft 34 is altered with respect to the LVDT 38 windings. LVDT 38 is connected to ECU 60 (connection not shown). LVDT 38 is shown by way of example; other types of position sensing devices may also be used.

Figure 3:
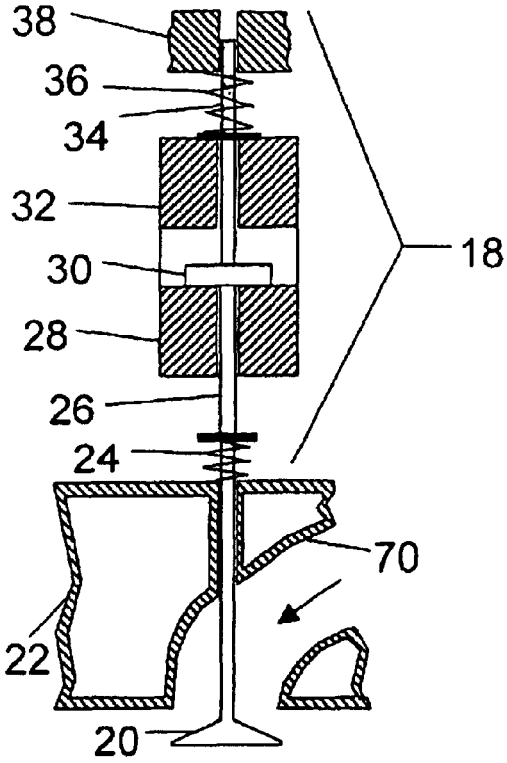
FIG. 3 is a detail of an example of an electromechanically-actuated poppet valve in an open position.

FIG. 3 shows the same hardware as shown in FIG. 2 with the difference being that FIG. 2 shows valve 20 in the fully closed position and FIG. 3 shows valve 20 in the fully open position. Thus, in FIG. 2, valve closing electromagnet 32 is energized and, in FIG. 3, valve closing electromagnet 28 is energized. In FIG. 2, valve opening spring 36 is compressed. Holding current is applied to valve closing electromagnet 32 to act against the spring tension of valve opening spring 36. Analogously, in FIG. 3, valve closing spring 24 is compressed. Holding current is applied to valve opening electromagnet 28 to act against the spring tension of valve closing spring 24.

Before discussing aspects of the present invention, an example of prior art control of an electromechanical valve is described. Typically, a valve, whether an intake or exhaust valve, of an internal combustion engine is normally closed, i.e., the valve is in the closed position for more of the time than the open position. Thus, the description of valve opening begins with a closed valve, i.e., with a holding current be applied to valve closing electromagnet 32. Actuating the valve proceeds by: de-energizing valve closing electromagnet 32 which causes the valve to open under the influence of valve opening spring 36; applying a peak current to valve opening electromagnet 28 to grab armature 30 when it is near its fully open position; applying a holding current to valve opening electromagnet 28 after armature 30 is attracted to valve opening electromagnet 28); applying holding current for as long as the desired open duration of the valve; de-energizing valve opening electromagnet 28 which causes the valve to close under the influence of valve spring 24; and, applying a peak current to valve opening electromagnet 32 to grab armature 30 when it is near its fully closed position. The terms peak current and holding current are concepts known to those skilled in the art and refer to a higher current level (peak current) used to catch a moving armature 30 and a lesser current (holding current) used to prevent a stationary armature 30 from moving.

Figure 4:
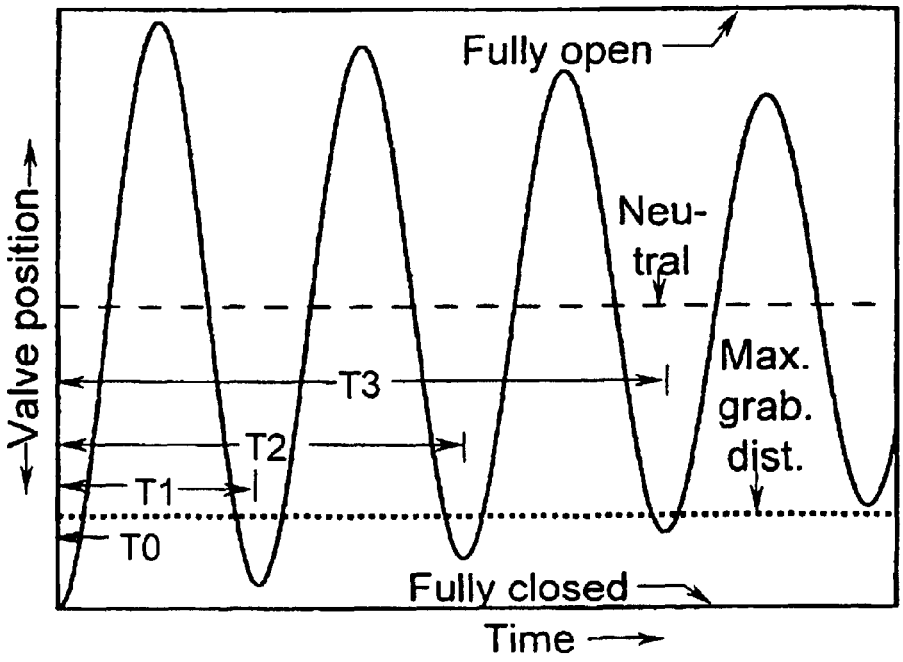
FIG. 4 is a graph of valve position over time for an electromechanically-actuated valve operating according to an aspect of the present invention.

The neutral position, i.e., the position that valve 20 attains when both electromagnets 28 and 34 are de-energized, is about halfway between the fully closed position, FIG. 2, and fully open position, FIG. 3. The exact neutral position would depend, though, on the relative spring tensions of valve opening spring 36 and valve closing spring 24. In FIG. 4, a plot of valve position as a function of time is shown for valve 20 under the situation that the valve at time T0 is at the fully closed position by virtue of holding current being applied to valve closing electromagnet 32. At time T0+, valve closing electromagnet 32 is de-energized. The valve lifts from the fully closed position and proceeds to a nearly open position by action of the valve opening spring 36. As valve 20 progresses to a nearly open position, valve closing spring 24 becomes compressed. Valve 20 then returns to a nearly closed position under the influence of the valve closing spring 24. The period of time that it takes for the valve to leave the fully closed position, travel to a nearly open position, and return to a nearly closed position is called a valve period and is indicated as T1 in FIG. 4. The oscillation of valve 20 continues, with each successive peak and trough being closer to the neutral position than the prior peak or trough, due to irreversibilities in the system. Eventually, valve 20 stops oscillating and attains the neutral position (not shown in FIG. 4). Period T2 is twice period T1 and period T3 is three times period T1, etc. The first three troughs of the curve in FIG. 4 are lower than the maximum grabbing distance dotted line with the $4^{th}$ trough being above the maximum grabbing distance. The maximum grabbing distance is the maximum distance away from the fully closed position that armature 30 may be and still allow valve closing electromagnet 32 to attract armature 30. If armature 30 is farther away from the fully closed position than the maximum grabbing distance, valve closing electromagnet 32 cannot attract armature 30, that is, at the peak current of the driving system (not shown). For the example shown in FIG. 4, after de-energizing valve closing electromagnet 32, armature 30 may be allowed to oscillate three periods and still allow valve closing electromagnet 32 to catch armature 30 at around the end of period T3. If valve closing electromagnet were not caught before valve 20 begins the fourth oscillation, valve 20 would not come to a position where valve closing electromagnet 32 could exert enough attractive force to catch valve 20.

As mentioned above, the power consumption in performing a valve catching, i.e., applying the peak current, is the predominant energy consuming function. In performing one cycle of valve open and close, prior art methods perform two such valve catching events:

valve grabbing near the fully open position and valve grabbing near the fully closed position. The present invention, in contrast, performs only one valve catching event, valve grabbing near the closed position. As a consequence, about a 50% electrical energy savings in electromechanical valve actuations is realized by practicing the present invention.

Figure 5:
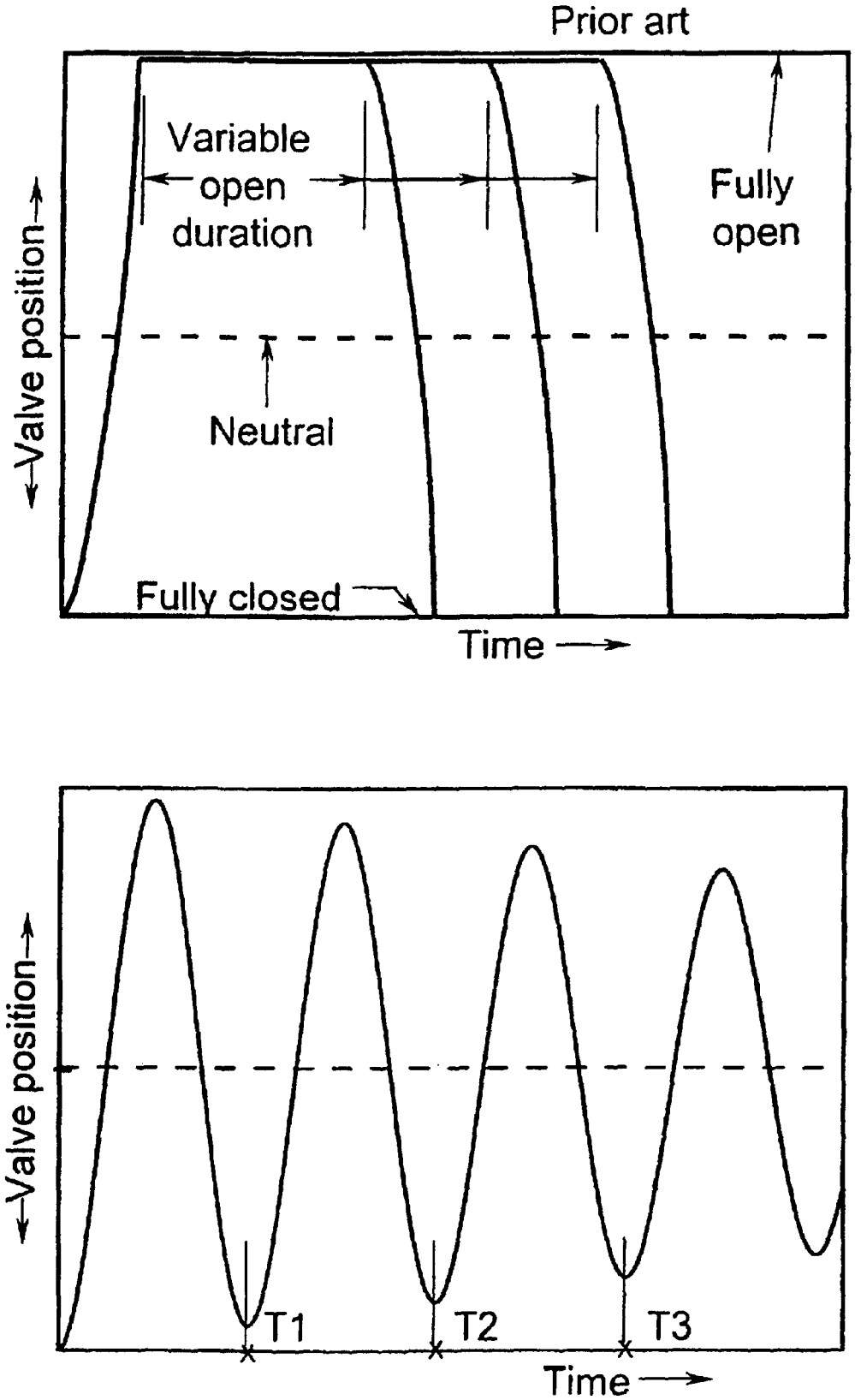
FIG. 5 is a graph of valve position according to prior art and a graph of valve position according to an aspect of the present invention.

The valve lift profiles and open duration provided by prior art are quite different from the present invention and are illustrated in FIG. 5. In the upper graph of FIG. 5 showing prior art, the valve opens and is held open for a variable duration and then the valve is closed. Three example durations are shown in FIG. 5. However, the minimum duration is the sum of the opening time and the closing time and the maximum duration is infinite. Referring now to the lower portion of FIG. 5, according to an aspect of the present invention, the valve opens and then the valve is grabbed to re-close at times near T1, T2, and T3 only in the example shown. Valve closing electromagnet 32 is not capable of grabbing armature 30, except when armature 30 is within the maximum grabbing distance (shown in FIG. 4), which occurs at discrete times after the valve is released by valve closing electromagnet 32. These discrete times are designated with an X on the abscissa of the lower graph of FIG. 5.

Comparing the valve profile of prior art, upper graph in FIG. 5, and that provided by the present invention, lower graph in FIG. 5, shows that the valve is retained in a fully open position in between valve opening and valve closing; whereas, the valve oscillates between nearly closed and nearly open according to the present invention. Actuation of intake valve 20, according to prior art, is preferred for inducting large quantities of air into the combustion chamber of engine 10. It is known to those skilled in the art that at engine operating conditions in which a lesser amount of air is desired, that opening intake valve 20 to less than the fully open position provides advantages. Specifically, intake turbulence is enhanced when air is drawn into cylinder 13 past a less open intake valve 20. Intake turbulence is known to those skilled in the art to accelerate the ensuing combustion event and to aid in ensuring robust combustion. Thus, the present invention, in which the valve is oscillating between a nearly open position and a nearly closed position is preferred in situations in which a lesser amount of air is to be inducted into cylinder 13.

Figure 6:
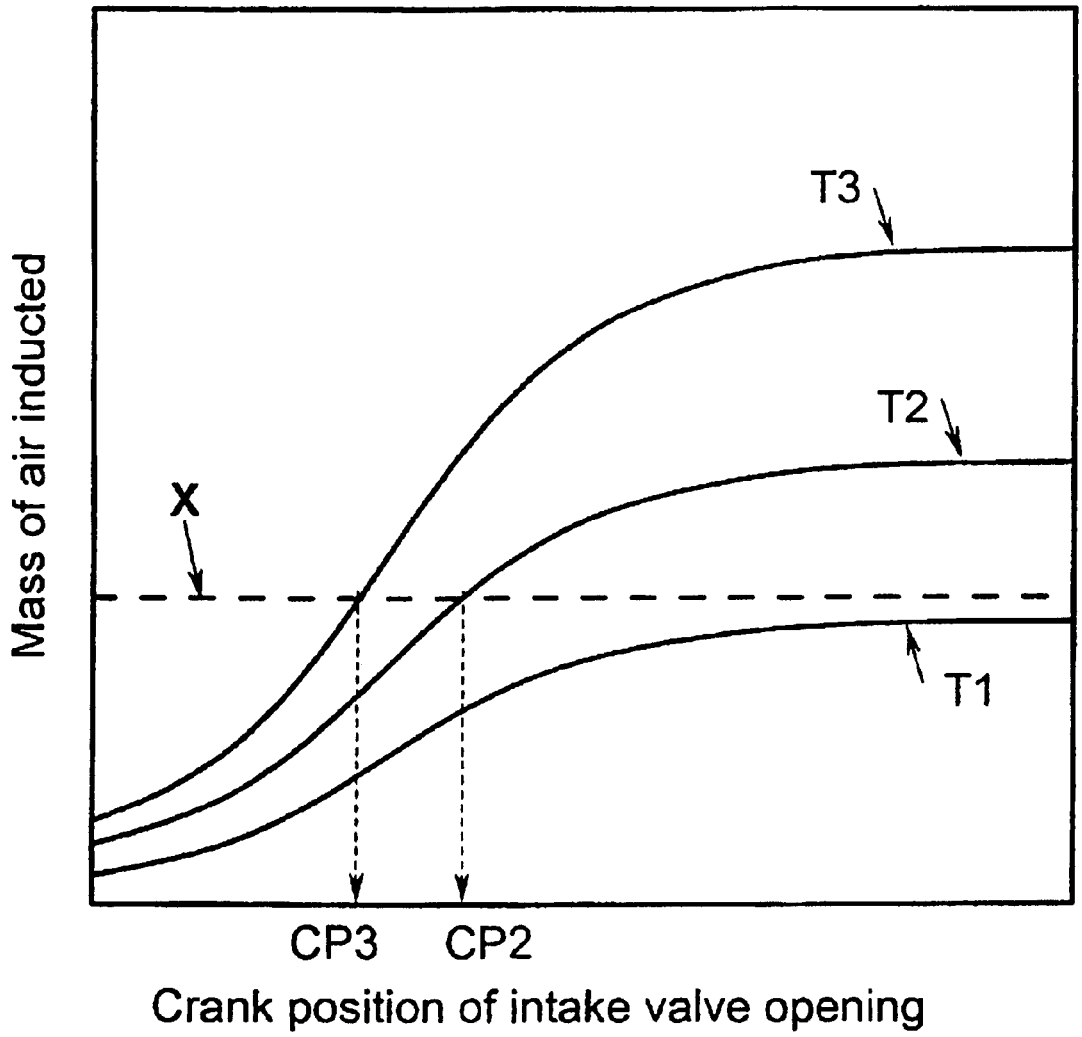
FIG. 6 is a graph of air flow inducted as piston position is varied.

When intake valve 20 is operated according to prior art approaches, the amount of air inducted can be determined by controlling the opening and closing time of the valve, as shown in the upper graph of FIG. 5. According to an aspect of the present invention, intake valve 20 is opened at any time; however, the closing occurs at predetermined intervals only. In the example shown in FIG. 4, intake valve 20 may be closed at times T1, T2, or T3. To induct the desired amount of air into the cylinder, the timing of intake valve 20 opening is adjusted, as shown in FIG. 6. The opening time, with respect to crank position (which is related to piston position), is shown in FIG. 6 on the abscissa and the mass of air inducted on the ordinate. The family of curves in FIG. 6 indicates the amount of air inducted if intake valve 20 were closed at times T1, T2, and T3. If, for example, the desired amount of air to be inducted is an amount Ma, shown in FIG. 6 by a dotted line, only T2 and T3 closings can be used to provide Ma. To provide exactly Ma, intake valve 20 would be opened at CP3, if it were being closed after the T3 interval and would be opened at CP2, if it were being closed after the T2 interval. In this example, the curve related to the T1 closing does not cross the dotted line indicating that a T1 closing cannot provide Ma.

According to an aspect of the present invention discussed above, closing of the valve occurs based on a number of valve periods or oscillations of the valve, i.e., based on a time. Alternatively, if the valve apparatus is equipped with a valve position sensor, such as a LVDT as shown in FIGS. 2 and 3, the valve closing may be initiated based on the position of the valve. As an example, the valve closing electromagnet is energized based on an indication from the LVDT that the valve is within the maximum grabbing distance of the valve closing electromagnet. The valve period is a function of the valve apparatus characteristics. If the characteristics change due to: deposits forming on the valve affecting the mass of the system, temperature changes affecting valve tension, lengths of system members, or other characteristics of the system, or aging affects such as wear, then the valve period may be affected. The position sensor on valve 20 could be used to determine the valve period at the particular set of conditions, to update the valve period in ECU 60 as the valve period changes, or to supplant the use of valve period in determining when to close the valve.

Figure 7:
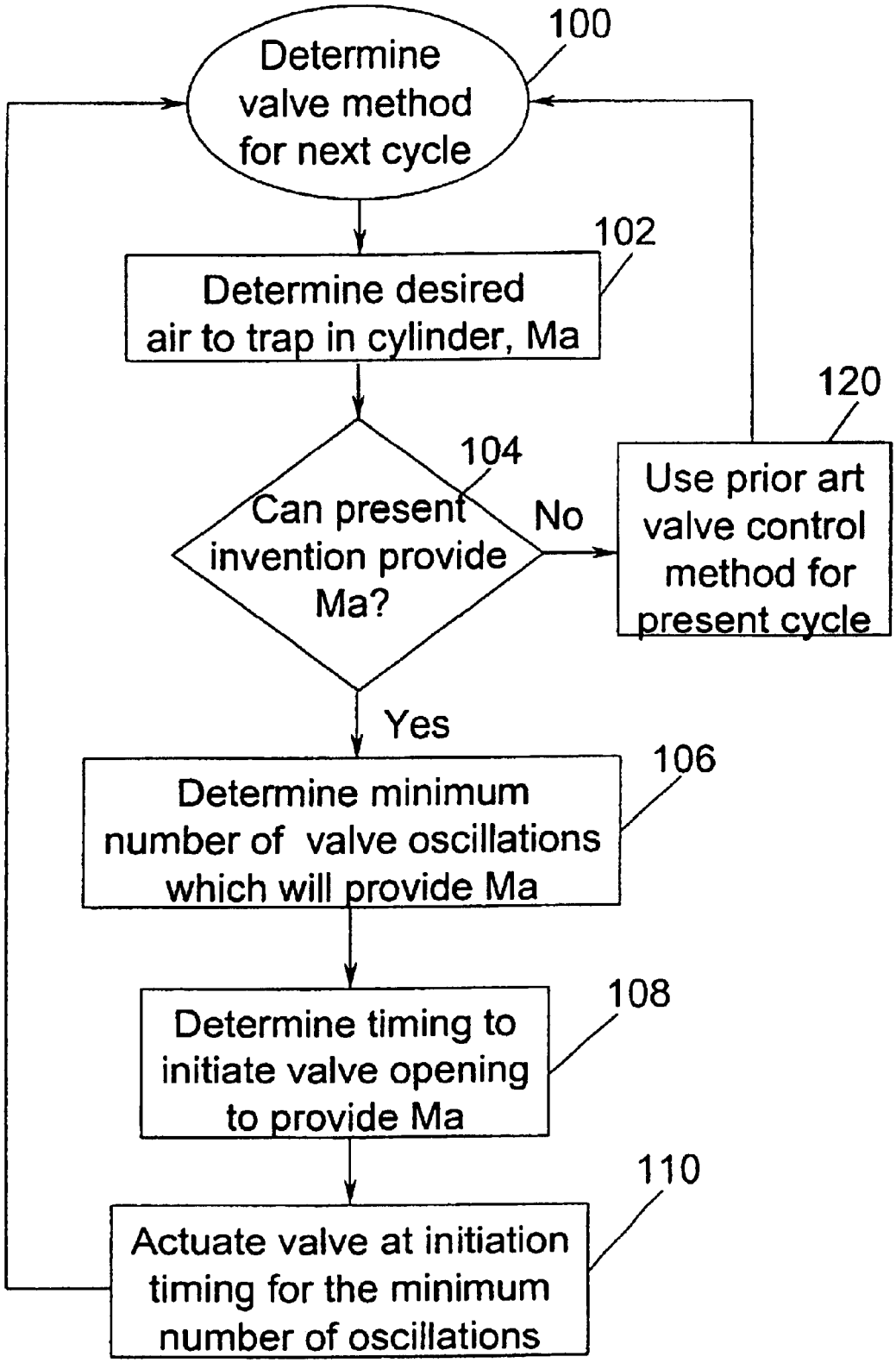
FIG. 7 is a flowchart indicating valve operating procedure.

A method of operating an engine according to an aspect of the present invention is shown in FIG. 7. The procedure begins in step 100. Control passes to step 102 in which it is determined how much air, Ma, should be trapped in the cylinder. This is based on driver demand for power. Control passes to step 104 in which it is determined whether the desired amount of air, Ma, can be provided by practicing the present invention. If not, control passes to step 120, in which prior art methods are used. The valve trajectory of prior art is shown in the upper half of FIG. 5 and is described above. From step 120, control returns to step 100, where a determination of valve procedure is determined for the next valve opening cycle. If a positive result in step 104, control passes to step 106 in which the minimum number of valve oscillations that can be used to provide Ma is determined. The minimum number is an integral number and is less than the number of oscillations in which the trajectory of armature 30 fails to attain the minimum valve grabbing distance. Control passes to step 108 in which the timing to initiate valve opening is determined. Constraints placed on the initiation time are that the number of oscillations is that which was found in step 106 and Ma is to be provided to the cylinder. Control is passed to step 110 in which the valve is opened starting at the initiation time found in block 108 and is open for the minimum number of oscillations. Control then returns to block 100.

In the above discussion of determining a valve opening time in step 108, the constraints discussed are the number of valve periods or oscillations over which the valve is open and providing the desired air, Ma.

Alternatively, the opening time could be constrained by a desired turbulence level of the inducted gases or a desired level of exhaust gases to trap in the cylinder. These alternative constraints could preferably be used in lean burn engines, that is, engines in which the amount of air delivered to the cylinder is more than that for fully combusting the fuel that is supplied to the cylinder.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed is:

1. A method for actuating [a] *an intake* valve disposed in a cylinder head of an internal combustion engine by an electromechanical valve system having an armature operatively connected to the valve, a valve closing electromagnet capable of exhibiting an electromagnetic force for attracting the armature to close the valve, a valve opening spring for biasing the armature in a direction to open the valve, and a valve closing spring for biasing the armature in a direction to close the valve, comprising the steps of:

de-energizing the valve closing electromagnet when said valve is in a substantially fully closed position;

maintaining the valve closing electromagnet in said de-energized state for a predetermined time enabling the valve to oscillate by force of the valve opening spring and the valve closing spring *while inducting air past the valve as it oscillates*; and energizing the valve closing electromagnet after said predetermined time to close the valve.

2. The method of claim 1, said predetermined time is based on oscillation characteristics of the valve when the valve closing electromagnet is de-energized.

3. The method of claim 1 wherein said valve is one of an intake valve and an exhaust valve.

4. The method of claim 1, wherein said predetermined time is approximately a valve period, said valve period is the time elapsed between de-energizing the valve closing electromagnet until the valve returns to a nearly closed position for a first time.

5. The method of claim 4, wherein said valve period is based on the spring constant of the valve opening spring, the spring constant of the valve closing spring, a mass of the valve, and a mass of the armature, and damping coefficients of the valve opening spring, the armature, and the valve.

6. The method of claim 1, wherein said predetermined time is substantially an integral number of valve periods, said valve period is the time elapsed between de-energizing the valve closing electromagnet until the valve returns to a nearly closed position.

7. The method of claim 6, wherein said integral number is less than a predetermined number.

8. The method of claim [6] *7*, wherein said predetermined number is the number of a first occurring oscillation of the armature at which a trajectory of the armature fails to attain a predetermined distance away from said fully closed position, said predetermined distance is a maximum distance that the armature may be away from the valve closing electromagnet while being capable of being attracted by the valve closing electromagnet.

9. The method of claim 1, wherein said predetermined time is a time when the valve is closer to a fully closed position of the valve than a distance at which the valve closing electromagnet is capable of attracting the armature and causing the valve to close.

10. An electromagnetic valve apparatus for actuating a valve disposed in a cylinder head of an internal combustion engine, the engine having at least one cylinder, comprising:

an armature operatively connected to the valve;

a valve closing electromagnet capable of exhibiting an electromagnetic force for attracting said armature to close the valve;

*a valve opening electromagnet capable of exhibiting an electromagnetic force for attracting said armature to open the valve;* a valve opening spring coupled to said armature for biasing said armature in a direction to open the valve;

a valve closing spring coupled to said valve for biasing the valve to a closed position; and an electronic control unit operably connected to said valve closing electromagnet de-energizes said valve closing electromagnet allowing the valve to oscillate by force of said valve opening spring and said valve closing spring and maintains said valve closing electromagnet in said de-energized state at least until the valve travels to a nearly open position and returns to a nearly closed position *without energizing the valve opening electromagnet*.

11. The system of claim 10 further comprising a position sensor coupled to said armature providing an indication of a position of the valve with respect to the cylinder head, said position sensor is connected to said electronic control unit.

12. The system of claim 11 wherein said electronic control unit energizes said valve closing electromagnet to cause the valve to close when said position sensor indicates that the valve is within a predetermined distance from said cylinder head.

13. The system of claim 12 wherein said predetermined distance is a maximum distance that said armature may be away from the valve closing electromagnet while being capable of being attracted by the valve closing electromagnet.

14. The system of claim 10 wherein said electronic control unit energizes said valve closing electromagnet at a predetermined time after said valve closing electromagnet is de-energized to cause the valve to close.

15. The system of claim 14, said predetermined time is based on dynamic characteristics of the valve and the electromagnetic valve apparatus.

16. The system of claim 14 wherein the valve is an intake valve.

17. The system of claim 16 wherein said predetermined time is determined so as to provide a desired quantity of air to one cylinder of the engine.

18. The system of claim 17 further comprising a piston disposed in the cylinder which reciprocates within the cylinder, wherein a time of performing said de-energizing step which enables oscillation of the valve is based on the position of said piston in the cylinder.

19. The system of claim 16, further comprising a throttle valve disposed in the intake duct of the engine, wherein a time of performing said de-energizing step which enables oscillation of the valve and a position of said throttle valve are determined to provide a desired quantity of air to one cylinder of the engine.

20. The system of claim 10 wherein the valve is an exhaust valve.

21. The system of claim 20 wherein the engine is a homogeneous charge compression ignition engine and an opening time and a closing time of the valve is based on a desired portion of exhaust gases to retain in one cylinder.

22. A method for actuating an intake valve disposed in a cylinder head of an internal combustion engine by an electromagnetic valve apparatus having a valve closing electromagnet capable of exhibiting an electromagnetic force for attracting the armature to close the valve, the valve opening electromagnet capable of exhibiting an electromagnetic force for attracting the armature to open the valve, a valve opening spring for biasing the armature in a direction to open the valve, a valve closing spring for biasing the armature in a direction to close the valve, comprising the steps of:

actuating the valve according to a first mode when a first set of engine operating conditions are detected, said first mode further comprises the steps of de-energizing the valve closing electromagnet; maintaining the valve closing electromagnet in said de-energized state for a first predetermined time enabling the valve to oscillate by force of the valve opening spring and the valve closing spring; and energizing the valve closing electromagnet after said first predetermined time to close the valve; and actuating the valve according to a second mode when a second set of engine operating conditions are detected, said second mode further comprises the steps of de-energizing the valve closing electromagnet to allow the valve to open, energizing the valve opening electromagnet in response to said de-energizing step to attract the armature to the valve opening electromagnet thereby causing the valve to open; de-energizing the opening electromagnet after a second predetermined time has elapsed since the valve opening electromagnet has been energized; and energizing the valve closing electromagnet in response to said de-energizing step of the valve opening electromagnet to attract the armature to the valve closing electromagnet thereby causing the valve to close.

23. The method of claim 22, wherein said first predetermined time is based on oscillation characteristics of the valve when the valve opening electromagnet is de-energized and the valve closing electromagnet is de-energized.

24. The method of claim 22, wherein the valve is an intake valve, said first set of engine operating conditions are those indicating a lower flow rate of air through the valve, and said second set of engine operating conditions are those indicating a higher flow rate of air through the valve.

25. The method of claim 22, further comprising the step of inducting air past the valve as it oscillates, when the valve is operated according to said first mode.

26. The method of claim 22, said first set of operating conditions is indicated by a lower engine speed and a lower engine torque.

27. A computer readable storage medium having stored data representing instructions executable by a computer to open a valve disposed in a cylinder of an internal combustion engine, the valve is actuated by an electromechanical valve apparatus having an armature operatively connected to the valve, a valve closing electromagnet capable of exhibiting an electromagnetic force for attracting said armature to close the valve, a valve opening spring for biasing said armature in a direction to open the valve, and a valve closing spring for biasing the valve closed, comprising:

instructions to de-energize the valve closing electromagnet; and instructions to energize the valve closing electromagnet at a predetermined time after said de-energizing instructions, wherein said predetermined time is based on an integral number of valve periods, said valve period is the time elapsed between de-energizing the valve closing electromagnet until the valve returns to a nearly closed position for a first time when the valve closing electromagnet is maintained de-energized.

28. The computer readable storage medium of claim 27 wherein the valve is an intake valve, further comprising:

instructions to determine a desired amount of air to induct into said cylinder; and instructions to determine said integral number of valve periods to cause said desired amount of air to be inducted into said cylinder.

29. The computer readable storage medium of claim 28, further comprising instructions to determine an initiation time to de-energize the valve closing electromagnet to provide said desired amount air to said cylinder, said initiation time is based on a position of a piston disposed in the cylinder.

30. The computer readable storage medium of claim 27, further comprising:

instructions to determine a desired amount of air to induct into the cylinder;

instructions to determine a desired amount of burned gases to trap in said cylinder;

instructions to determine said integral number of valve periods during which the valve is allowed to oscillate and to determine an initiation time to de-energize the valve closing electromagnet based on said desired amount of air and said desired amount of burned gases, said initiation time is based on a position of a piston disposed in the cylinder.

31. The computer readable storage medium of claim 27, further comprising:

instructions to determine a desired amount of air to induct into the cylinder;

instructions to determine a desired turbulence level of the gases trapped in the combustion chamber; and instructions to determine said integral number of valve periods during which the valve is allowed to oscillate and to determine an initiation time to de-energize the valve closing electromagnet based on said desired amount of air and said desired turbulence level, said initiation time is based on a position of a piston disposed in the cylinder.

32. The computer readable storage medium of claim 27 wherein said integral number of valve periods is less than a predetermined number of valve periods.

*33. A method for actuating a valve disposed in a cylinder head of an internal combustion engine by an electromechanical valve system having an armature operatively connected to the valve, a valve closing electromagnet capable of exhibiting an electromagnetic force for attracting the armature to close the valve, a valve opening spring for biasing the armature in a direction to open the valve, and a valve closing spring for biasing the armature in a direction to close the valve, comprising the steps of:*

*de-energizing the valve closing electromagnet when said valve is in a substantially fully closed position;*

*maintaining the valve closing electromagnet in said de-energized state to open the valve while the valve oscillates by force of the valve opening spring and the valve closing spring, without energizing an electromagnet to hold open the valve; and*

*energizing the valve closing electromagnet after said maintaining to close the valve.*

*34. The method of claim 33 further comprising varying a timing of said energizing to vary the closing timing of the valve.*

*35. The method of claim 33, wherein a time that the valve closing magnet is maintained in said de-energized state is based on oscillation characteristics of the valve when the valve closing electromagnet is de-energized.*

*36. The method of claim 33, wherein said valve is one of an intake valve and an exhaust valve.*

*37. The method of claim 33, wherein a time that the valve closing magnet is maintained in said de-energized state is approximately a valve period and where said valve period is the time elapsed between de-energizing the valve closing electromagnet until the valve returns to a nearly closed position for a first time.*

*38. The method of claim 37, wherein said valve period is based at least on the spring constant of the valve opening spring, the spring constant of the valve closing spring, a mass of the valve, and a mass of the armature, and damping coefficients of the valve opening spring, the armature, and the valve.*

*39. The method of claim 33, wherein a time that the valve closing magnet is maintained in said de-energized state is substantially an integral number of valve periods, and where said valve period is the time elapsed between de-energizing the valve closing electromagnet until the valve returns to a nearly closed position.*

*40. The method of claim 39, wherein said integral number is less than a predetermined number.*

*41. The method of claim 40, wherein said predetermined number is the number of a first occurring oscillation of the armature at which a trajectory of the armature fails to attain a predetermined distance away from said fully closed position, said predetermined distance is a maximum distance that the armature may be away from the valve closing electromagnet while being capable of being attracted by the valve closing electromagnet.*

*42. The method of claim 33, wherein a time that the valve closing magnet is maintained in said de-energized state is a time when the valve is closer to a fully closed position of the valve than a distance at which the valve closing electromagnet is capable of attracting the armature and causing the valve to close.*

*43. The method of claim 33, wherein the electromechanical valve system further comprises a valve opening electromagnet capable of exhibiting an electromagnetic force for attracting the armature to open the valve.*

*44. The method of claim 1, wherein the electromechanical valve system further comprises a valve opening electromagnet capable of exhibiting an electromagnetic force for attracting the armature to open the valve.*

*45. A method for actuating an intake valve disposed in a cylinder head of an internal combustion engine by an electromagnetic valve apparatus having a valve closing electromagnet capable of exhibiting an electromagnetic force for attracting the armature to close the valve, a valve opening electromagnet capable of exhibiting an electromagnetic force for attracting the armature to open the valve, a valve opening spring for biasing the armature in a direction to open the valve, a valve closing spring for biasing the armature in a direction to close the valve, comprising the steps of:*

*actuating the valve according to a first mode when a first set of engine operating conditions are detected, said first mode further comprising the steps of de-energizing the valve closing electromagnet; maintaining the valve closing electromagnet in said de-energizing state to enable the valve to oscillate by force of the valve opening spring and the valve closing spring without energizing the valve opening electromagnet; and energizing the valve closing electromagnet to close the valve; and*

*actuating the valve according to a second mode during a second set of engine operating conditions, said second mode further comprising the steps of de-energizing the valve closing electromagnet to allow the armature to open, energizing the valve opening electromagnet thereby causing the valve to open; de-energizing the valve opening electromagnet to allow the valve to close; and energizing the valve closing electromagnet thereby causing the valve to close.*

*46. The method of claim 45, wherein the valve is an intake valve, said first set of engine operating conditions are those indicating a lower flow rate of air through the valve, and said second set of engine operating conditions are those indicating a higher flow rate of air through the valve.*

*47. The method of claim 45, further comprising inducting air past the valve as it oscillates, when the valve is operated according to said first mode.*

*48. The method of claim 45, wherein the first set of operating conditions is indicated by lower engine speed and a lower engine torque.*

* * * * *